Dec. 31, 1968 L. M. DAVIS ETAL 3,419,262

CARD FEED MECHANISM

Filed Sept. 10, 1964 Sheet 1 of 5

INVENTORS
Leonard M Davis,
Dolph Gobel,
George H. Simmons
atty.

Inventors:
Leonard M. Davis,
Dolph Gobel,
By George H. Simmons, Att'y

INVENTORS
Leonard M. Davis,
Dolph Gobel,
BY George H. Simmons
atty

Inventors:
Leonard M. Davis,
Dolph Gobel,
By George H. Simmons Atty

INVENTORS.
Leonard M. Davis,
Dolph Gobel,
George H. Simmons
atty

United States Patent Office 3,419,262

Patented Dec. 31, 1968

3,419,262

CARD FEED MECHANISM

Leonard M. Davis, Fair Lawn, N.J., and Dolph Gobel, Great Neck, N.Y., assignors to Shaw-Walker Co., Muskegon, Mich., a corporation of Michigan Filed Sept. 10, 1964, Ser. No. 395,474
9 Claims. (Cl. 271—3)

ABSTRACT OF THE DISCLOSURE

A mechanism for feeding a properly oriented card completely into a computer and out of manual reach, for holding the card in that position during an operating cycle of the computer initiated by the card, for ejecting the card at the end of the cycle, and for ejecting an improperly oriented card without initiating a cycle of the computer.

This invention relates to computers and has for its principal object the provision of a new and improved computer of this type.

It is a main object of the invention to provide a computer which incorporates a feed mechanism equipped with control means that is actuated by a card manually inserted in the machine, to start the feed mechanism in operation to feed a card into tthe computer and to remove the card from manual control prior to the initiation of a cycle of operation of the computer by the card.

Another object of the invention is to provide a computer having a card feed mechanism that operates to move a card into predetermined position in the computer, is stopped while the card is in that position during a cycle of operation of the computer, and while stopped aids in holding the card in that predetermined position.

Another object of the invention is to provide a computer having a card feed mechanism operable in one direction to move a card into the computer and operable in a reverse direction to move the card out of the computer at the end of a cycle of operation of the computer.

Another object of the invention is to provide a computer having a card feed mechanism that is reversed to eject an improperly positioned card prior to the initiation of a cycle of operation of the computer.

Further objects of the invention not specifically mentioned here will be apparent from the detailed description and claims which follow reference being had to the accompanying drawings in which a preferred embodiment of the invention is shown by way of example and in which:

Figure 1:
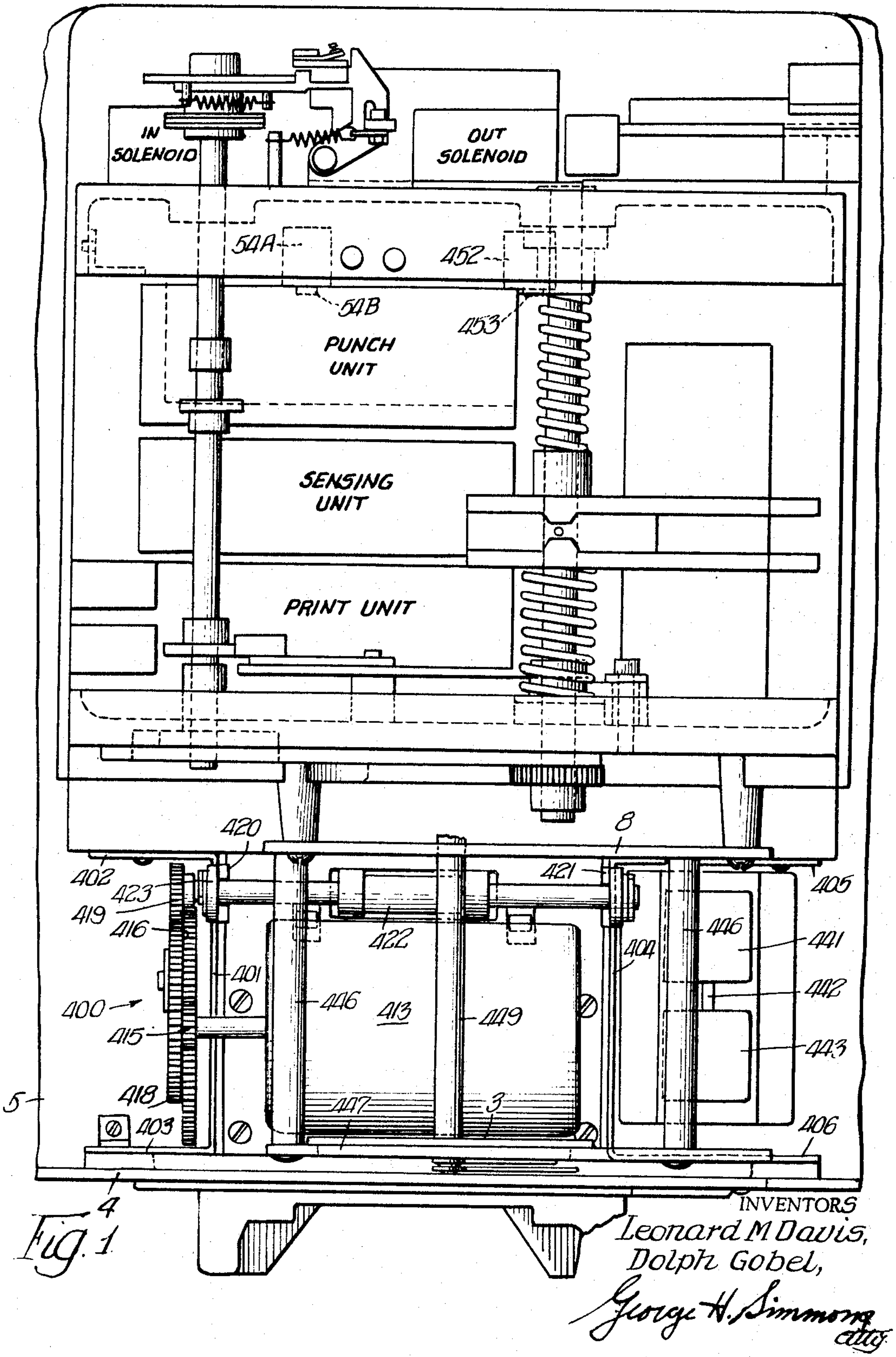
FIG. 1 is a plan view, partly diagrammatic, showing a computer equipped with a card feed mechanism.

It has been found that in commercial service the elapsed time computer covered by Robinson et al. Patent No. 2,983,443 sometimes malfunctions notwithstanding that the computer itself is in proper working order. These malfunctions have been determined to be caused by the manner in which a card is manipulated into and out of the computer by a workman.

At the beginning of a cycle of operation of the computer the card is clamped by an electro magnetically operated clamping bar and is maintained clamped throughout the cycle. It has been found that many workmen attempt to remove the card from the card chute prior to completion of the cycle of operation of the computer with the result that the card is torn and in certain instances perforations punched in the card have been improperly located in it, with the result that when the card is again inserted in the machine, these perforations are not properly aligned with the sensing fingers, with the result that an erroneous computation of elapsed time will be recorded upon the card. In certain instances a card has been withdrawn sufficiently to restore the card actuated switch by which the cycle of operation was initiated and the computer has stopped before completing the cycle.

The present invention solves this difficulty by incorporating in the computer disclosed in the above mentioned patent, a card feed mechanism. To this end the base and frame structure of the computer are extended forwardly and a motor driven feed mechanism and controls therefor are mounted upon this extension. The feed mechanism consists of a motor driven roll adapted to engage one face of a card and an idler roller adapted to be spring pressed against the other face of the card.

As a card is being inserted in the machine by a workman, the leading edge of the card engages control means shortly before it moves into engagement with the feed rollers. The card operates the control means which starts the rollers moving in the direction to draw the card into the machine. As the card moves inwardly the computer is conditioned for operation.

Before the card reaches the position that it is to occupy during the cycle of operation of the computer, the trailing edge of the card is drawn into the machine and hence is not available to the workman. When the card reaches the position it is to occupy during the cycle of operation of the computer, the feed rollers are stopped and the card held by those rollers as well as by the electromagnetic clamping bar in the computer.

Upon the completion of the cycle of operation of the computer, the electromagnetic clamping bar is released and the feed rollers operated in the direction to eject the card from the machine and thereby render it again available to the workman.

In order that the computer may function in a proper manner it is necessary that the card be inserted in a particular position; that is, the cards must be inserted face up and right end to. To guard against operation of the computer upon an improperly inserted card a rejection mechanism is provided. To this end the card is provided with a U-shaped notch or indentation located upon the end of the card that is to be the leading end during insertion in the computer. When the card is properly inserted, the rejection mechanism control projects into this notch in the card and therefore is not operated by the card. Should the card be inserted face down the notch will not register with the rejection mechanism, consequently that mechanism will be operated to operate the rollers and thereby eject the improperly inserted card without operating the computer mechanism. Should a card be inserted wrong end to, a cycle of operation will be initiated and in addition the reject mechanism will be activated. The addition of the automatic card feed mechanism to the computer by removing control of the card from the workman, insures that the computer will function properly so long as it is in proper working condition. An improper operation of the computer and resulting torn cards are definitely eliminated.

The invention will be understood best by reference to the drawings wherein the feed mechanism is shown incorporated in the elapsed time computer shown in the Robinson et al. Patent No. 2,983,443. This particular disclosure is given by way of example only as the feed mechanism of the present invention can be used in conjunction with other devices and such use is contemplated. For the sake of clarity, the parts of the Robinson computer shown in the drawings and referred to herein, bear the same numbers as in the patent.

Referring now to the drawings, particularly FIG. 1, it will be seen that the card feed mechanism indicated generally at 400 is attached to the front wall of the computer which is diagrammatically shown in this figure. As will be seen in FIG. 2 the card chute of the computer contains a printing zone 40, a sensing or computing zone 40–A, and a punching zone 40–B. The card feed mechanism adds to the card chute a fourth or feeding zone indicated at 407.

The card feed mechanism contains a framework consisting of a vertically disposed channel shaped member 401, one flange 402 of which is attached to the framework of the computer in convenient manner such as by screws. The second flange 403 is fixed upon the base 5 of the computer and serves as a support for the face plate 4 of the computer.

The framework consists of a second vertically disposed channel shaped member 404, the flange 405 of which is attached to the frame of the computer in convenient manner such as by screws. The other flange 406 is also fixed upon the base 5 and supports the other end of the guide plate 4 of the computer. Members 401 and 404 extend upwardly from base 5 and forwardly from the frame of the computer. Fixed to the webs of members 401 and 404 near the tops thereof and extending therebetween is a channel shaped first plate 407 which forms the deck of the card chute zone 407. Fixed upon the upper face of the web of plate 407 adjacent the edges thereof are spacer strips 408 upon the upper surfaces of which is fixed a second plate 409. The plates 407 and 409 together with the spacers 408 define a card chute that extends from front to back of the feed mechanism.

Figure 2:
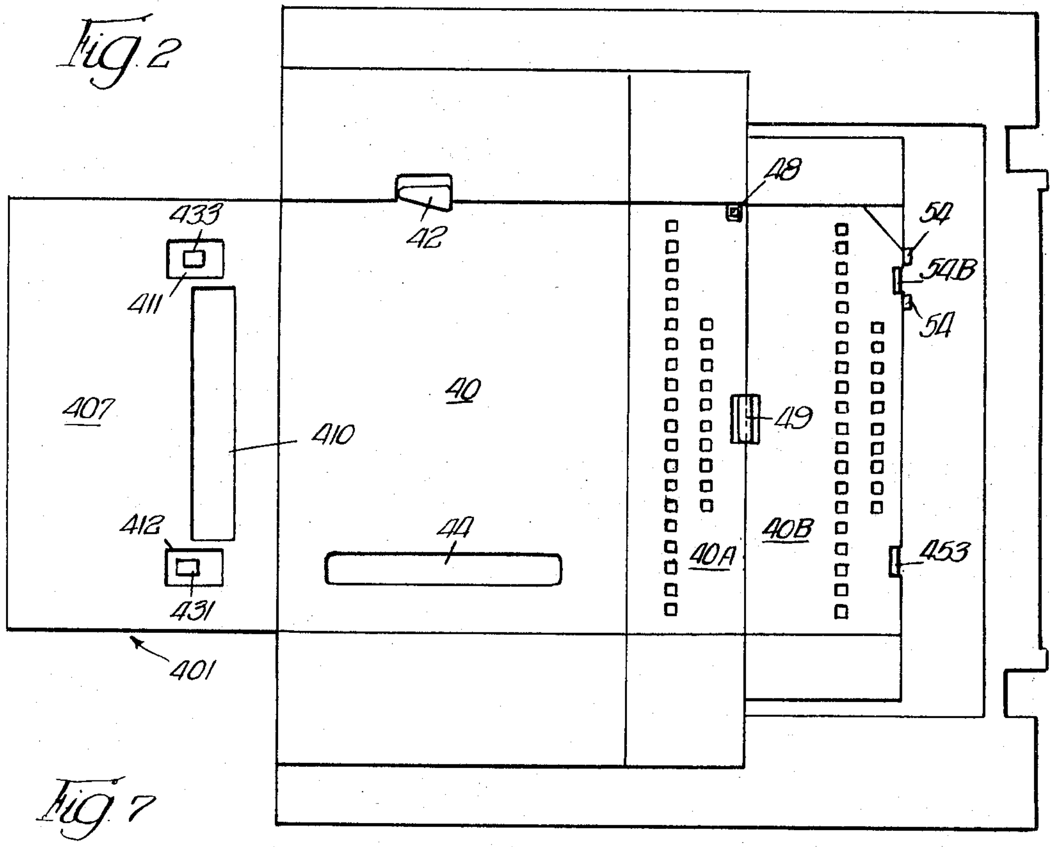
FIG. 2 is a diagrammatic plan view showing the deck of the computer and card feed mechanism.

As will be seen best in FIG. 2 the plates 407 and 409 each contain a rectangular perforation 410 through which feed rolls project, as will presently appear. These plates also contain smaller perforations 411 and 412 through which are extended the operating levers of card operated switches, as will presently appear.

Card feed motor 413 is mounted upon the second plate 409 and a bottom feed roll 414 has a shaft which is journaled in the members 401 and 404 by suitable bushings. The shaft of the motor carries a pinion 415 which meshes with an intermediate gear 416 journaled upon the member 401. A pinion 417 fixed upon gear 416 meshes with a gear 418 that is journaled upon the member 401. The shaft of the feed roll 414 carries a pinion 419 which meshes with the gear 418. Thus it will be seen that the gear train connects the motor to the feed roll 414.

Plate 409 carries upstanding ears 420 and 421 each of which contains a slot opening into its upper end through which slot the shaft of an upper feed roll 422 projects.

Arms 423 and 424 carry suitable bushings journaling the arms upon the shaft of roll 422. Suitable means such as C clamps 425 engaged in grooves in the shaft hold the bushing and arms upon the shaft. Springs 426 and 427 extend between the lower ends of the arms 423 and 424 respectively and pins carried by the members 401 and 404 respectively. Through this arrangement the upper feed roll 422 is spring pressed against the lower feed roll 414. It will be obvious that the feed rolls 414 and 422 are registered with and project through the slots 410 in the first and second plates 407 and 409. Feed rolls 414 and 422 are composed of a suitable material such as rubber which is capable of moving a card as the rolls are rotated.

Fixed upon member 404 by suitable means is a switch

430 preferably a snap acting switch, the operating lever 431 of which projects through the perforations 412 in the first and second plates. In a similar manner a switch 432 is mounted upon the member 401 with its operating lever 433 projecting through the perforations 411 in the first and second plates. Also mounted upon the member 401, by suitable means, is a cut off relay 434. Mounted between flanges 405 and 406 is a latching relay assemblage indicated generally at 440.

There are a number of latching relay assemblages available upon the open market; the particular one being shown consisting of a first relay 441, the armature of which is maintained in operated position by a latching bar 442 carried on the armature of a second relay 443. Operation of relay 443 unlatches the armature of relay 441 which falls back and latches the armature of relay 443 in operated position after its coil is deenergized. Thus one or the other armature is latched in operated position at all times.

Contacts carried upon the armature of relay 441 are utilized in the circuitry of the feed mechanism and although the relay 443 also carries a like plurality of contacts, these are not all used in the instant application.

Figure 3:
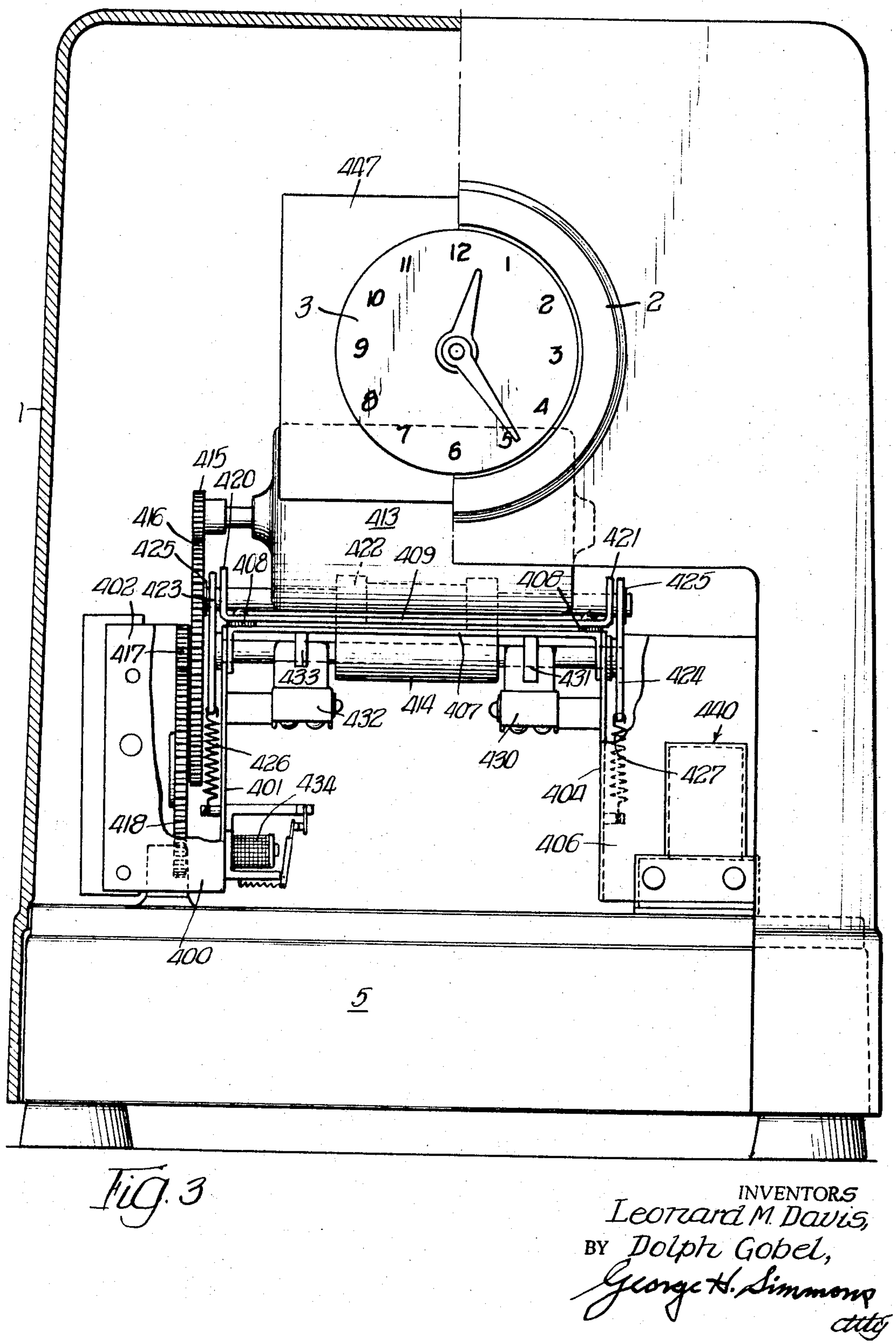
FIG. 3 is a front elevational view of the computer with the face plate thereof removed and with a portion of the cover cut away to show the feed mechanism.
Figures 4, 5:
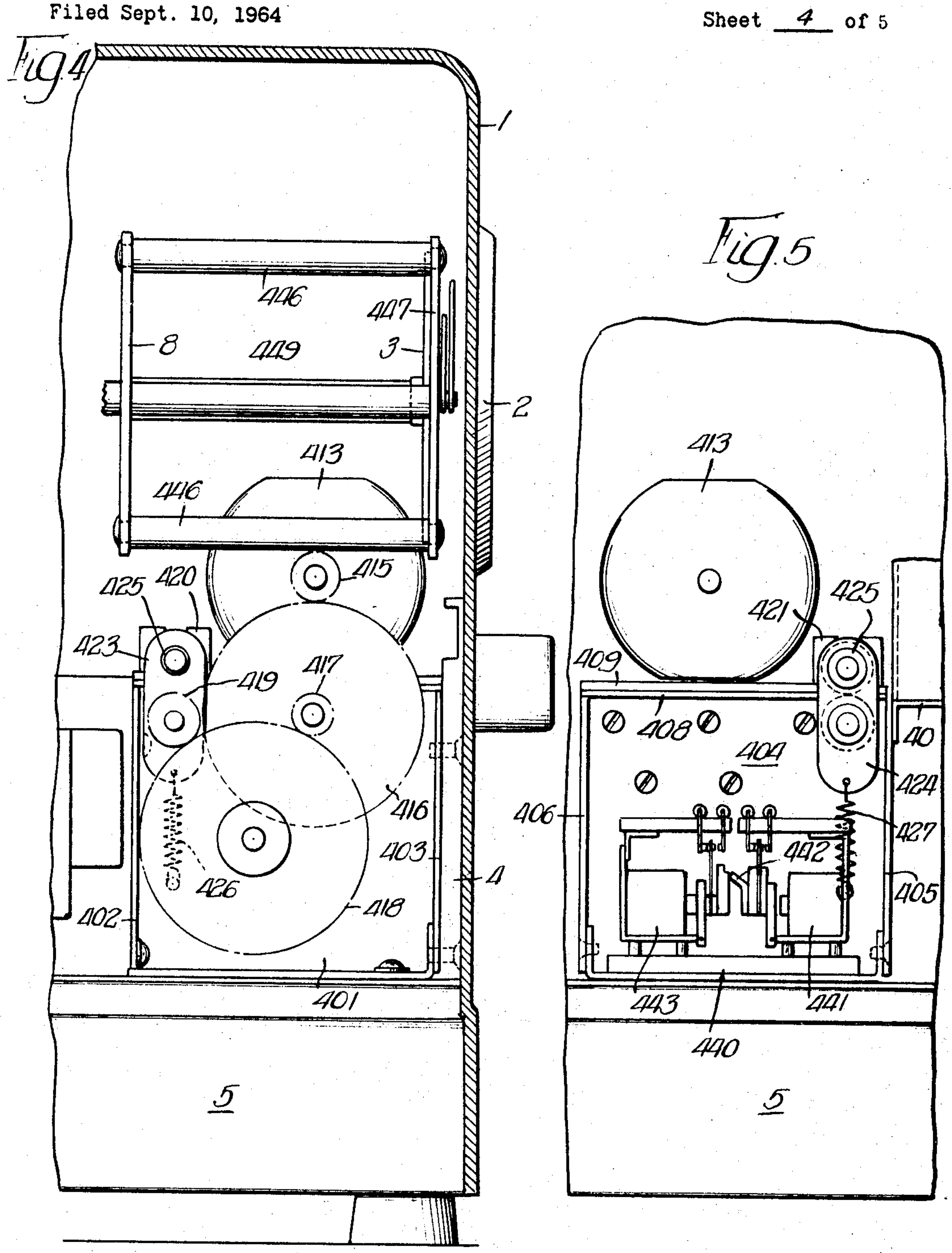
FIG. 4 is a fragmentary side elevational view, partly in section showing the feed mechanism.
FIG. 5 is a fragmentary elevational view, showing the other side of the feed mechanism.

As will be seen in FIGS. 1, 3 and 4 the clock dial escutcheon 8 is equipped with a plurality of spacing bars or tubes 446 which support at their outer ends an escutcheon 447 to which the clock face 3 is attached. Concentric drive tubes 449 extend forwardly from the clockwork mechanism of the computer and support at their outer ends the hour and minute hand of the clock, rendering the time of day indication visible through the window 2 with which the cover 1 of the computer is equipped.

Figure 7:
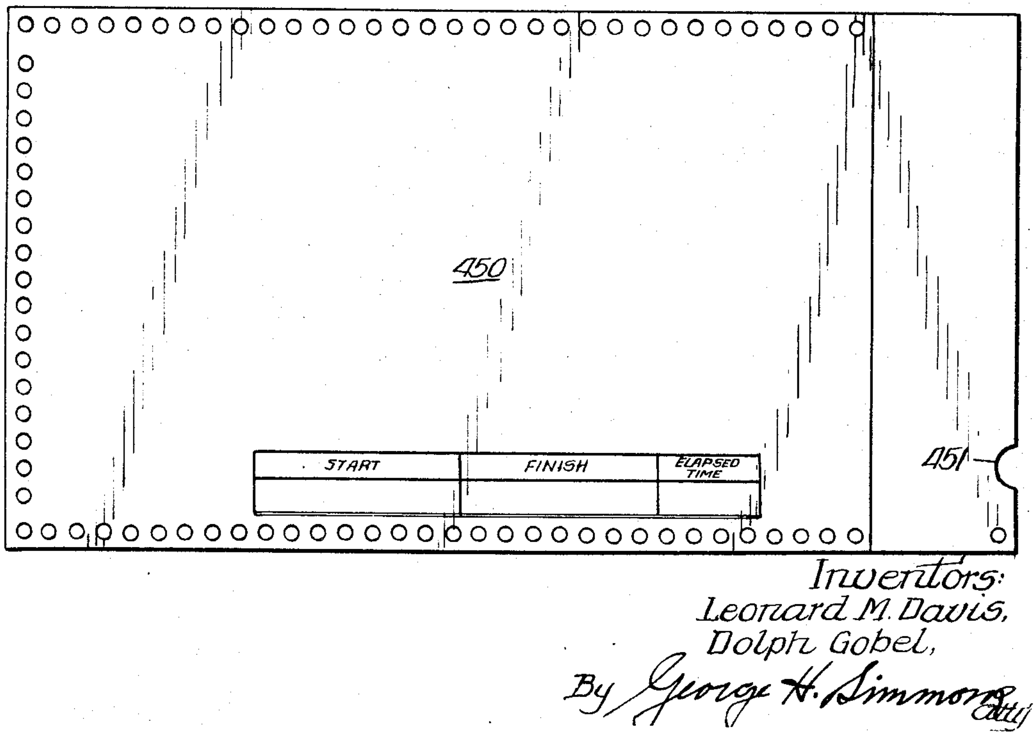
FIG. 7 is a plan view of a record card adapted for use in the computer.

FIG. 7 shows a typical accounting system card 450 which is equipped with a notch 451 in its end that is the lead end when the card is properly inserted in the computer. As will be seen in FIGS. 1' and 2, the switch 54–A mounted upon the back of the punch unit of the computer has an operating lever 54–B located between fixed stops 54. Also located at the back edge of the punch unit is a reject switch 452, the operating lever 453 of which projects upwardly from the plate 40–B.

When a card is inserted in the machine face up, as the feed rollers push the card through the printing zone it operates make ready switch 42 to prepare the electrical circuits of the computer. Assuming that the card is being inserted for the first time, the leading edge of it engages the lever 48 to lower start lever 49 out of the range of the card, permitting the card to move through the computing zone into the punch zone. Since the card is inserted properly, notch 451 is aligned with the reject switch lever 453 and that lever projects into the notch as the card moves into engagement with stops 54, hence the reject switch is not operated. The un-notched portion of the leading edge of the card moves lever 54–B, thereby initiating the cycle of operation of the machine in the manner fully explained in the above mentioned Robinson patent.

Levers 54–B and 453 are located equi-distant from the center line of the card chute. Should a card be inserted face down, the notch 451 will register with the lever 54–B and the un-notched portion of the card will operate the reject switch lever 453 to reject the improperly positioned card without initiating the cycle of operation of the computer.

The feed rolls are located at a distance from the front edge of the feed mechanism sufficient to cause the rolls to draw the trailing edge of the card completely into the machine before the leading edge thereof registers with either the lever 48 or the lever 49. Thus, through operation of the card feed mechanism the card is moved completely out of reach of a workman prior to arriving in the position that it is to occupy during the computing cycle of the machine. Since the punch cycle position of the card is farther back in the machine, the card is also out of reach of the workman during this cycle.

The distance between the rollers of the fixed stops 54 is less than the length of the card with the result that when the card is located in this extreme position in the computer, the trailing edge of the card is disposed outwardly from the rollers hence the engagement of the rollers with the card aids in holding the position during the operating cycle. This engagement of the rollers with the card facilitates ejection of the card from the machine at the completion of the cycle of operation of the machine.

FIRST INSERTION OF A CARD FACE UP

Figure 6:
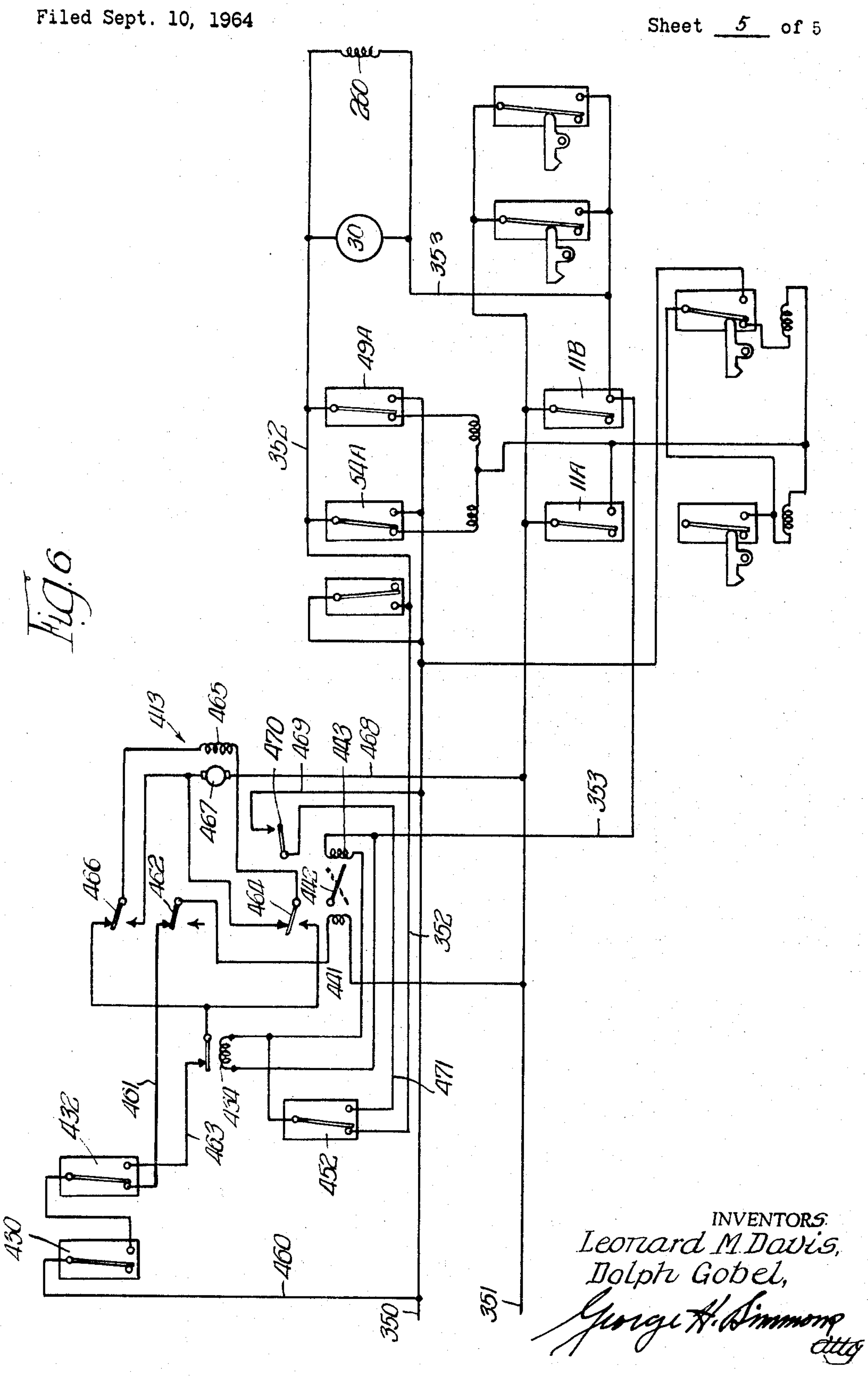
FIG. 6 is a schematic diagram showing the circuit of the computer.

The operation of the card feed mechanism will be best understood from the schematic circuit diagram shown in FIG. 6. As a card is being manually inserted in the card chute by a workman, the leading edge of the card engages the operating lever 431 of switch 430 operating that switch. A circuit may now be traced from one side of the source of commercial current on conductor 350, conductor 460, through the make contacts of switch 430, through the break contacts of switch 432, conductor 461, spring 462 and its break contact, through the winding of relay 441, to the other side of the commercial current on conductor 351. Relay 441 operates over this circuit closing its main springs against their respective make contacts, and opens its own circuit at spring 462. Operation of the armature of relay 441 unlatches the armature of relay 443 which restores into engagement with the armature of relay 441 to maintain that armature in operated position.

Further movement of the card inwardly in the card chute engages the leading edge thereof with the operating lever 433 of switch 432 moving that switch into operated position.

A circuit may now be traced from the previously traced circuit to the main spring of switch 432, now engaged with its make contact thence over conductor 463, through the normally closed contacts of relay 434, thence through main spring 464 of relay 441 and its make contact, through the field coil 465 of motor 413, thence through main spring 466 and its make contact, through the armature 467 of motor 413, thence over conductor 468 to the other side of commercial current on conductor 351. Motor 413 operates over this circuit rotating the feed rolls in the direction to feed the card inwardly through the card chute.

As the card moves through the print zone, cam lever 42 is moved outwardly thereby operating switches 11–A and 11–B in the computer. Assuming that the card is being inserted for the first time, the leading edge thereof engages lever 48 FIG. 2, operating that lever to move switch control lever 49 out of the path of the card permitting the card to be pushed through the computing zone and into the punch zone 40–B.

Since the card is correctly inserted face up, when the leading edge thereof moves into engagement with the fixed stops 54 operating lever 54–B of switch 54–A in the computer will be moved to operate the switch. A circuit may now be traced from conductor 350 through the make contact of switch 54–A, conductor 352, through the motor 30 and the magnet 260 of the computer in parallel, conductor 353, hence through the make contacts of switch 11–B to the other side of commercial current on conductor 351.

Conductor 352 extends through the normally closed contacts of reject switch 452, thence through the winding of relay 434 and the winding of relay 443 in parallel, thence over conductor 353 to the other side of commercial current on conductor 351 through the make contacts of switch 11–B. Cut off relay 434 operates over this circuit opening its normally closed contacts thereby opening the circuit of motor 413 to stop that motor. Relay 443 also operates over this circuit unlatching the armature of relay 441 permitting that armature to restore since the magnet of relay 441 is now deenergized. Main springs 464 and 466 are thus moved into engagement with their respective break contacts preparing a circuit for operating the motor in a reverse direction. Main spring 462 moves into engagement with its break contact without effect at the moment.

As is fully explained in the above mentioned Robinson patent, at the completion of a cycle of the computer, switches 11–A and 11–B are restored to normal thereby opening the circuit over which relays 434 and 443 are operated. The circuit of relay 443 is opened but the armature thereof is maintained in operated position by the latch bar 442, since relay 441 is in restored position. Cut off relay 434 restores; closing its normally closed contacts thus extending the feed motor circuit through main spring 466 and its break contact, through the field coil 465 of motor 413, through main spring 464 and its break contact, thence through the armature 467 of the motor, to conductor 468. Motor 413 operates over this circuit in a reverse direction driving the feed rolls in a reverse direction thereby pulling the card out of the chute of the computer and through the feed zone.

When the now trailing edge of the card clears the feed rollers the now leading edge of the card will project from the throat of the card chute sufficiently far to permit it to be grasped by a workman for manual removal from the machine. When the card moves out of engagement with the operating levers of switches 430 and 432, these switches restore thereby restoring the feed mechanism to its normal position in readiness for its next cycle of operation when a card is again inserted therein.

As the card is being ejected from the machine switch 432 will be restored before switch 430 is restored. Relay 441 being restored spring 462 engages its break contact and the circuit of relay 441 will be closed momentarily. Since the card is ejected at a relatively high speed the interval between the restoration of switch 432 and switch 430 will be short and the pulse sent to relay 441 may not be of sufficient duration to operate the relay. If relay 441 operates on this pulse it will be latched in operated position by latch 442. If the relay does not operate on this pulse it will be operated when next a card is manually inserted in the machine.

RE-INSERTION OF A CARD FACE UP

When a card is inserted in the machine a second time lever 48 will not be operated to move switch lever 49 out of the chute and switch 49–A will be operated by the card to initiate a computing cycle. The operation of the feed mechanism is as above except that conductor 350 is connected to conductor 352 through switch 49–A instead of through switch 54–A.

INSERTION OF A CARD FACE DOWN

In the event that a card is improperly inserted face down instead of face up, when the card is moved into engagement with the fixed stops 54 the notch 451 therein will register with the operating lever 54–B hence switch 54–A will not be operated. Under these circumstances the leading edge of the card will engage the operating lever 453 of the reject switch 452 operating that switch to move its main spring into engagement with its make contact. Relay 441 having been operated by the operation of switches 430 and 432, upon the closing of the make contacts of switch 452 a circuit may now be traced from conductor 350, conductor 469, through the break contact and main spring 470, conductor 471, through the make contact and main spring of switch 452, thence over previously traced circuit through relays 434 and 443 to the other side of commercial power on conductor 351 through conductor 353 and the make contact of switch 11–B. Relay 434 operates over this circuit to open the motor circuit and thereby stop the forward movement of the card. Relay 443 unlatches the armature of relay 441 restoring that armature and thereby moves the main springs carried thereby into engagement with their respective break contacts. Operation of relay 443 moves spring 470 away from its break contact to open the circuit of relays 434 and 443 restoring relay 434 to normal. Although the circuit of relay 443 is opened this relay is latched in operated position since relay 441 is in normal position.

Movement of the main spring of relay 434 into engagement with its break contact closes the previously traced circuit to the motor 413 to operate that motor in a reverse direction and thereby eject the improperly inserted card from the machine without initiating a cycle of operation of the computer.

From the foregoing it will be apparent that with the card feed mechanism incorporated as an integral part of a computer and positioned therein so as to draw a card completely within the machine prior to its arrival in a position it is to occupy during the cycle of the machine, damage to the card and data printed thereon resulting from a premature moving of the card by a workman is entirely eliminated. The feed mechanism also aids in holding the card in fixed position throughout a cycle of operation of the computer. The rejection of improperly positioned cards prior to the initiation of a cycle eliminates improper recordations in and on an improperly inserted card. The reliability of the computer is thus enhanced.

Having thus complied with the statutes and shown and described a preferred embodiment of our invention; what we consider new and desire to have protected by Letters Patent is pointed out in the appended claims.

What we claim is:

1. A card feed mechanism incorporated as an integral part of a computer, which mechanism comprises:

(a) a framework attached to the base and frame of the computer and including vertically disposed members fixed to the frame of the computer and extending forwardly therefrom;

($a^1$) a first top plate fixed between said members and aligned with the card chute plates of the computer to form an extension of the card chute;

($a^2$) spacer strips fixed upon said top plate and defining the edges of said chute extension;

($a^3$) a second top plate fixed upon said strips;

(b) a pair of feed rollers journalled in the vertical members of said framework and extending through perforations in said top plates into engagement each with the other;

(c) a reversible electric motor mounted upon said second top plate;

(d) a gear train connecting said motor to one of said feed rollers;

(e) relay means for controlling said motor;

(f) and switch means, operable by a card, for operating said relay means and having levers projecting through other perforations in said top plates.

2. A card feed mechanism as claimed in claim 1 in which the gear train connects the motor to the lower feed roller which is journalled in said side members.

3. A card feed mechanism as claimed in claim 1 in which the second plate contains a pair of upstanding ears each having a slot opening into its upper end through which slots the shaft of the upper feed roller projects, an arm adjacent each ear in which arms the shaft is journalled, and spring means connected between said arms and framework for spring pressing the upper roller into engagement with the lower roller.

4. A card feed mechanism as claimed in claim 1 in which the relay means includes a latching relay assembly consisting of two electromagnetic relays the armatures of each of which relay in restored position latches the armature of the other relay in operated position thereby to hold make contacts on the first of said relays closed to prepare a circuit to the motor preparatory to driving that motor in the direction to feed the card into the computer.

5. A card feed mechanism as claimed in claim 4 in which the relay means includes a cut off relay having normally closed contacts that are included in the motor circuit, the winding of the cut off relay being connected in parallel with the winding of the second one of said latching relays.

6. A card feed mechanism as claimed in claim 5 in which upon the initiation of a cycle of operation of the computer by a card fed into the computer by the mechanism, power fed to the mechanism by the computer operates the cut off relay to stop the motor and operates the second latching relay to release the first latching relay which restores to prepare the circuit for operating the motor in a reverse direction.

7. A card feed mechanism as claimed in claim 6 in which upon completion of the cycle of operation of the computer said parallel circuit is opened and the cut off relay restores to close the motor circuit operating the motor to eject the card from the computer.

8. A card feed mechanism as claimed in claim 6 in which a reject switch located in the computer is operated by an improperly inserted card to operate the cut off and latching relays to reverse the motor and eject the card from the computer.

9. A card feed mechanism as claimed in claim 6 in which the switch means includes a computer start switch and a reject switch mounted in the computer equidistant from the center line of the card chute of the computer and in which the cards contain a notch that registers with the reject switch when the card is face up to enable the card to operate only the start switch, and in which the notch registers with the start switch when the card is face down to enable the card to operate only the reject switch.

References Cited

UNITED STATES PATENTS 2,632,643 3/1953 Egan ---------------- 271—3
2,995,976 8/1961 Weingart.

EDWARD A. SROKA, *Primary Examiner.*

U.S. Cl. X.R.

271—53, 80